July 28, 1970      J. L. ARCHER      3,521,957

MIRROR PROTECTOR MEANS FOR SOLAR RADIATION TESTING MACHINES

Filed Feb. 14, 1968      2 Sheets-Sheet 1

INVENTOR.
JERMIAH L. ARCHER
BY

INVENTOR.
JERMIAH L. ARCHER

United States Patent Office 3,521,967
Patented July 28, 1970

3,521,967
MIRROR PROTECTOR MEANS FOR SOLAR RADIATION TESTING MACHINES
Jermiah L. Archer, Phoenix, Ariz., assignor to Coleman R. Caryl, doing business as Desert Sunshine Exposure Tests
Filed Feb. 14, 1968, Ser. No. 705,358
Int. Cl. G02b 27/32
U.S. Cl. 356—256                                    9 Claims

ABSTRACT OF THE DISCLOSURE

A mirror protector means for solar radiation testing machines comprising a movable cover means adapted to be moved into position over solar radiation mirror means to protect the mirror means and to prevent damage to the mirror means, as well as to interrupt radiation of the sun's rays onto the mirror means and reflection thereof from the mirror means to a materials radiation testing target area of the machine.

---

This invention relates to a mirror protector means for solar radiation testing machines, and more particularly, to a mirror protector means for solar radiation testing machines which will automatically cover mirrors of such machines during an emergency.

BACKGROUND OF THE INVENTION

Machines for solar radiation testing of various materials have been utilized to cause accelerated deterioration of materials as may be effected by the rays of the sun, together with intermittent applications of moisture as may be caused by rain.

A prime example of the prior art is Pat. 2,945,417 issued to C. R. Caryl et al, June 19, 1960.

Such apparatus as disclosed in said patent had been used for testing of a great variety of materials, and it has been found that the mirrors of these machines must be maintained in excellent condition in order properly to conduct several solar radiation tests.

Various hazards to these mirrors may include storms, which may damage the mirrors either by way of abrasive action, impingement of hail stones, and a variety of foreign matters.

Additionally, it has been found that in some instances, during power failures, when the electrical or other power sources fail and the machines do not properly cool the samples of material being tested, that a means may be desirable to prevent continued concentration of solar rays on the articles or materials being tested.

The prior art includes generally means for air cooling of materials being tested, while subjected to concentrated rays of the sun, as accomplished by the reflective mirrors of these machines. When a power failure occurs and the air cooling means discontinues a flow of air over the samples of materials being tested, continued radiation may tend to burn samples, and thus invalidate a test which may have been carried on over a considerable length of time.

SUMMARY OF THE INVENTION

The present invention comprises a mirror protector means for solar radiation testing machines which not only protects the mirror means of such machines from various hazards, such as those encountered in storms, but the invention also provides a mirror cover means which serves an additional function, namely, that of interrupting solar radiation to the mirrors and reflection from the mihorrs to samples being tested during a power failure such as to prevent undue heating of the samples when the sample cooling means of the machine becomes inoperative. The present invention is specifically related to machines, such as disclosed in the hereinbefore mentioned patent, wherein an elongated radiation target area supports materials being tested, and wherein a pair of groups of elongated mirrors at opposite sides of the radiation target area convergingly reflect sun's rays onto the area, and wherein a pair of movable cover plates may be pivoted into position outwardly and downwardly from a median area of the machines into covering position with respect to their groups of mirrors. The invention also comprises a novel linkage for synchronizing and concurrently controlling the movement of the cover plates over the pairs of mirrors, and additionally provides for latching means to hold the cover plates downwardly over the mirrors during storms so that the cover plates may not be displaced from their covering position over the mirrors.

Accordingly, it is an object of the present invention to provide a mirror protector means for solar radiation testing machines which is adapted automatically and during an emergency to move into covering position over the mirror means of solar radiation testing machines, and to protect the mirror means from damage as may be caused by storms, or the like.

Another object of the invention is to provide a mirror protector means for solar radiation testing machines which serves a dual function in that it may protect mirrors of such machines, and also may interrupt radiation to said mirrors and from said mirrors to samples of materials being tested in order to prevent damage to the materials when cooling means of the machine fails.

Another object of the invention is to provide a novel actuating and linkage means for a pair of mirror cover plates of the invention in order efficiently to control concurrent operation of said pair of cover plates into positions for covering a pair of groups of elongated mirrors which may be disposed in angularly converging relation at opposite sides of a radiation target area of the machine of the invention.

Further objects and advantages of the invention may be apparent from the following specification, appended claims, and accompanying drawings:

DESCRIPTION OF THE PREFERRED EMBODIMENTS

Figure 1:
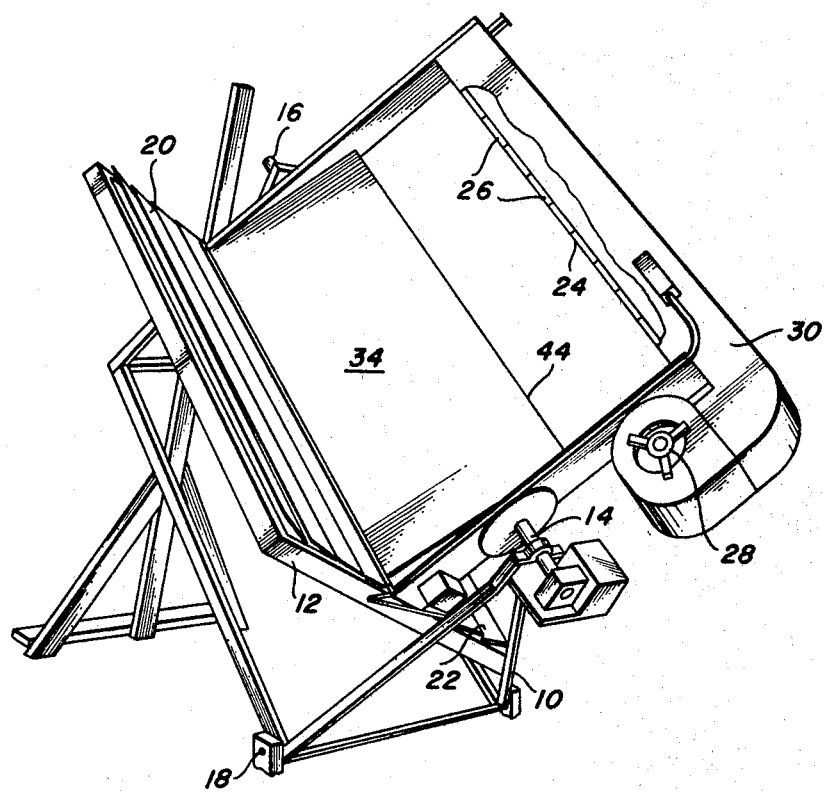
FIG. 1 is a perspective view of a solar radiation testing machine showing the mirror protecting means for solar radiation testing machines of the invention in connection therewith.

The present invention comprises a solar radiation testing machine having a base frame 10 and a movable frame 12 pivoted thereon about an axis passing through shafts 14 and 16 which are axially aligned with each other and supported by the base frame 10. The base frame 10 is pivoted on a horizontal axis 18 to permit it to be tilted into various positions on an inclined or horizontal plane and at substantially right angles to the rays of the sun throughout the various seasons of the year, and each hour of the day.

Carried by the pivoted frame 12 is a first group 20 of elongated substantially parallel mirrors, and also carried on the pivoted frame 12 is a second group 22 of elongated substantially parallel mirrors. These groups 20 and 22 of mirrors are disposed at angles, such that all of the mirrors reflect the sun's rays to a narrow elongated radiation target area 24 disposed substantially centrally between the groups 20 and 22, thus the radiation target area 20 being adapted to support a plurality of samples of materials, generally designated 26.

A blower 28 delivers cooling air through a duct 30 into cooling relation with the test samples 26 in a similar manner to that taught in the aforementioned Pat. 2,945,417.

Figure 2:
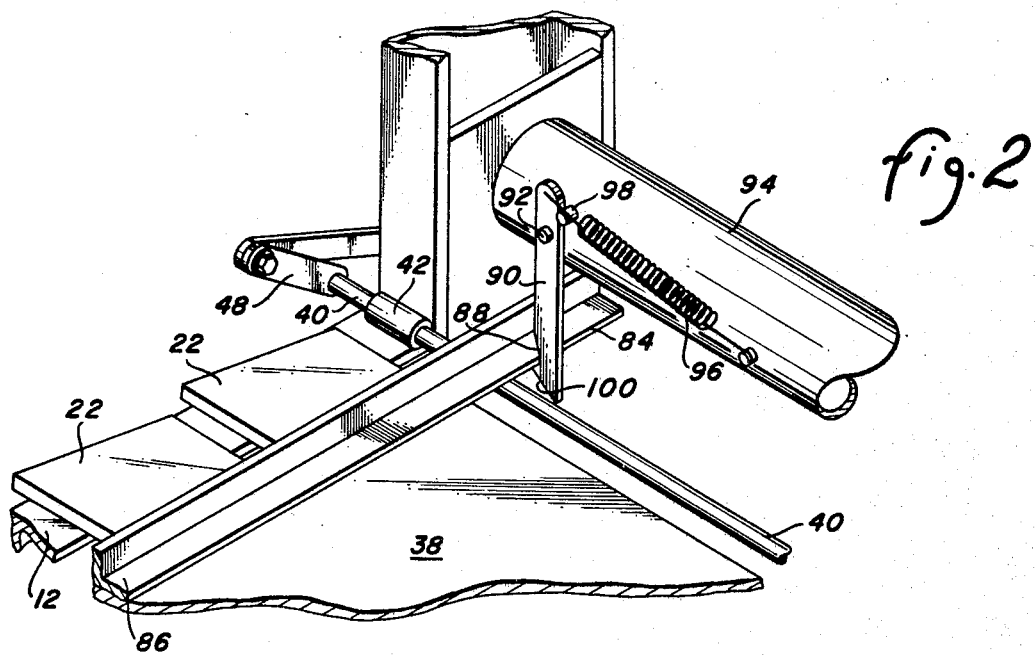
FIG. 2 is an enlarged fragmentary perspective view of a portion of the back side of the machine, as shown in FIG. 1, and illustrating the mirror protector means of the invention and details of the latch means thereof.
Figure 3:
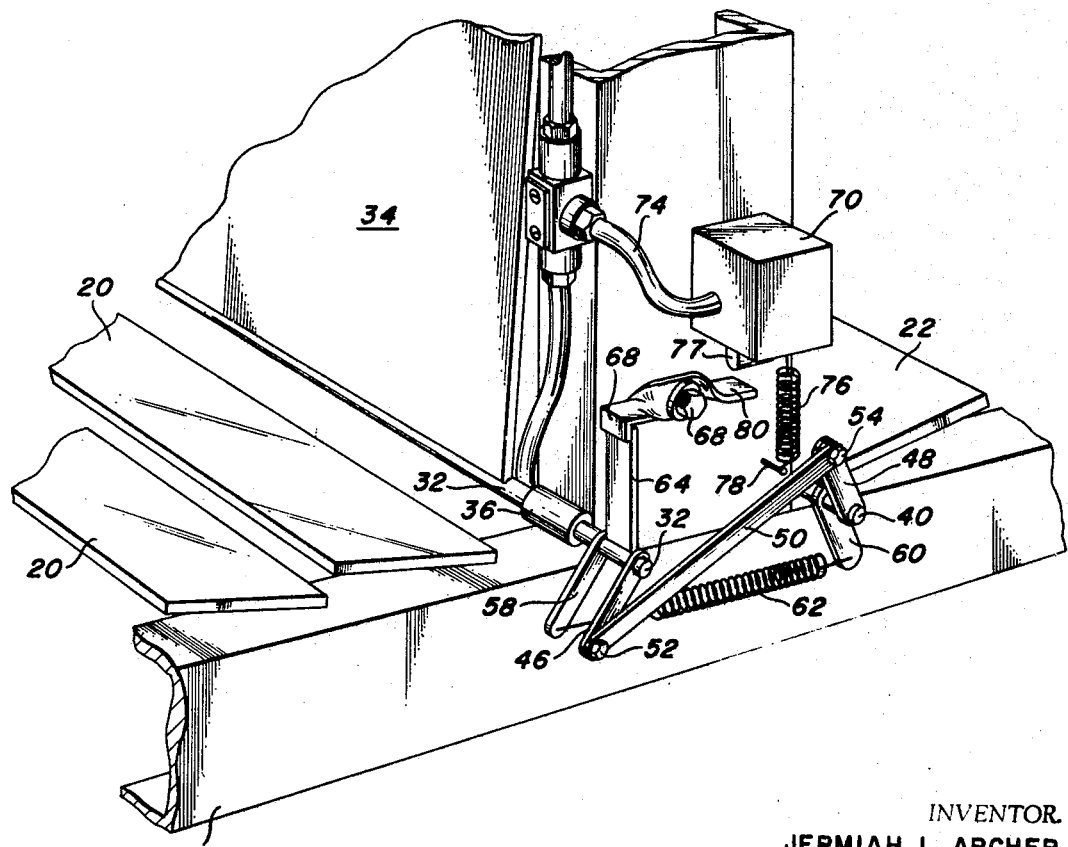
FIG. 3 is an enlarged fragmentary sectional view of the invention taken from substantially the same direction as FIG. 1, but showing details of the mirror cover linkage and actuator mechanism of the invention, and also showing details of the solenoid latch means in connection with the linkage.

Pivoted to the movable frame 12 is a shaft 32 carrying a mirror protector cover 34. This shaft 32 is journalled in suitable bearings 36 carried on the movable frame 12, as shown best in FIG. 3 of the drawings. Likewise, a second cover plate 38 shown in covering position relative to the group of mirrors 22, this cover plate 38 is carried by a shaft 40 pivotally mounted in suitable bearings 42 on the movable frame 12. It will be understood that the cover plates 34 and 38 are connected by linkage which will either hold both cover plates in an upstanding position, as shown in FIG. 1 of the drawings, or in a downward mirror covering position, as shown in FIG. 2 of the drawings, as will be hereinafter described in detail.

The cover plates 34 and 38 are similar, and the cover plate 34, as shown in FIG. 1 of the drawings, is provided with an upwardly disposed free edge 44 positioned below the radiation target area 24, and between the groups of mirrors 20 and 22, so that radiation therefrom is not interrupted by these covers when in the position, as shown in FIG. 1. The upstanding free edge portions 44 being above the pivotal axis of the supporting shafts 32 and 40, and being adapted to move outwardly and downwardly in an arcuate path about the axes of these shafts into covering position relative to the group of mirrors 20 and 22.

The shaft 32 carries a bell crank 46, while the shaft 40 carries a bell crank 48. A link 50 interconnects these bell cranks 46 and 48 in pivotal relation therewith by means of connecting bolts 52 and 54. The bell crank 48 extends in an upward direction, while the bell crank 46 extends in a downward direction and the link 52 is pivotally connected at opposite sides of the axes of the shafts 32 and 40 relative to the respective bell cranks 46 and 48 so that both of the cover plates 34 and 38 will be synchronized in their movements to move upwardly together and to move downwardly together, as will be hereinafter described in detail.

Also connected to the shafts 32 and 40 are second bell cranks 58 and 60, respectively, intermediate and to which a tension spring 62 is connected tending to rotate the shafts 32 and 40 in opposite directions in order to move the cover plates 34 and 38 downwardly into covering position relative to the groups of mirrors 20 and 22, as will be hereinafter described in detail.

Connected to the shaft 32 and disposed in upstanding relation when the cover plate 34 is in upstanding relation is a latch arm 64. This latch arm 64 is pivoted by means of a bolt 66 to the movable frame 12, and the latch arm is provided with a dog portion 68 adapted to hold the upper end of the arm 64, such as to prevent counter-rotation of the shaft 32 in a direction to permit downward movement of the cover plates 34 and 38 into covering relation with the groups of mirrors 20 and 22, respectively.

A solenoid 70 which is electrically operable is provided with a conventional armature 72 which is held retracted by electrical energy supplied through a conductor means 74.

The spring 76 tends to pull the armature 72 downwardly, this spring 76 is anchored by a support 78 carried by the movable frame 12.

Thus, when power fails, the armature 72 is adapted to be forced downwardly into engagement with an end 80 of the pivoted latch 68 to cause clockwise pivotal movement of the latch 68 about the bolts 66, and to release the upper end of the arm 64 from the dog portion of the latch member, and consequently to allow tension of the spring 62 to force the arms 58 and 60 toward each other and to cause the link 50 and bell cranks 46 and 48 to cause unison movement of the cover plate 38 together with the cover plate 34 outwardly and downwardly into covering position over the respective groups of mirrors 20 and 22.

As the cover plate 34 and 38 move downwardly, an end portion 84 of a frame 86 of the cover plate 38 is engaged in a notch 88 of a latch bar 90 pivoted at 92 on a cross member 94 of the pivoted frame 12. The latch bar 90 is provided with a spring 96 spring loading the notch 88 toward the frame element 84 of the cover plate 38, and a stop 98 on the cross bar 94 prevents over travel of the notch 88 of the lever 90 substantially relative to the frame 84 so that as the frame 84 reaches a desirable substantially horizontal position above the respective mirrors 22, the cover plate is stopped to prevent impingement with the mirrors, and likewise, the cover plate 34 by means of the bell cranks 46 and 48 connected by the link 50 prevents the cover plate 34 from contacting the respective mirrors 20.

The latch bar 90 thus holds the cover plates 34 and 38 downward to prevent them from being moved up by wind, and also acts to prevent the cover plates from striking the mirrors 20 and 22, as the respective cover plates move into covering position.

An inclined end 100 on the latch bar 90 provides for automatic pivoting thereof by the frame member 84 when this frame 84 swings downward into a position to hold the cover plate 34 in covering position relative to the mirrors 22.

It will be understood by those skilled in the art that the cover plates 34 and 38 may thus be actuated into a covering position over the respective groups of mirrors 20 and 22 for the purpose of shielding them from flying debris, hail or other materials, such as abrasives during storms, and further, the cover plates 34 and 38 when actuated into covering position relative to the mirrors 20 and 22, prevent radiation from the sun from contacting the mirrors, and thus prevent radiation from the mirrors to the samples of materials 26 in the radiation target area 24. This mode of operation is an added function of the cover plates 34 and 38, and it will be understood that the blower 28 is electrically operable by the same source of electrical energy that is coupled to the solenoid 70. In this manner, when the power fails with respect to the operation of the machine of the invention, the solenoid 70 is energized to release the actuating mechanism of the cover plates 34 and 38 and they are moved downwardly into covering relation with the groups of mirrors 20 and 22. The source of electrical energy to the solenoid 70 and the blower 28 may be controlled by an operator in charge of such facility who must care for a large number of machines in the facility. When electrical energy is deliberately disconnected from the solenoid 70, the cover plates 34 and 38 are thus actuated into covering relation with respective mirrors. In this manner, at the approach of a storm or other hazard to the mirrors 20 and 22, the operator may electrically actuate means for covering all of the mirrors in connection with a large number of machines in a testing facility.

Additionally, the invention has a distinct advantage in the automatic operation of the cover plates 34 and 38 during an electrical power failure beyond the control of the operator of the test facility. When this power failure occurs, the blower 28 ceases to operate and under these conditions, the test samples 26, as shown in FIG. 1, are under a hazard, namely, that continued radiation from the mirrors 20 and 22 without cooling air to the samples 26 might cause undue damage thereof, however, when power fails to the blower 28, it also fails to the solenoid 70 and automatically causes the cover plates 34 and 38 to cover the mirrors 20 and 22 and to interrupt radiation from the sun to the mirrors 20 and 22 and radiation or reflection of the solar energy from the mirrors to the sample materials 26.

It will be obvious to those skilled in the art that various modifications of the present invention may be resorted to in a manner limited only by a just interpretation of the following claims.

I claim:
1. In a mirror protector means for solar radiation testing machines, the combination of: a base frame; a movable frame pivoted on said base frame about a pivotal axis disposed at an angle to rays of sunshine and disposed to permit said movable frame to be constantly adjusted about said axis so as to maintain a substantially constant angular relation to said rays; mirror means supported on said movable frame; a materials holding radiation target means carried by said movable frame in spaced relation to said mirror means, said mirror means disposed to reflect rays of sunshine onto said radiation target means; a mirror cover means carried by said pivoted frame and movably mounted thereon to be actuated into and out of covering relation to said mirror means.

2. The invention, as defined in claim 1, wherein: actuating means is disposed to operate said mirror cover means into a covering position relative to said mirror means.

3. The invention, as defined in claim 2, wherein: said actuating means is electrically operable.

4. The invention, as defined in claim 2, wherein: said mirror means comprises two groups of elongated flat parallel mirrors, mirrors of each group angularly disposed to reflect rays of sunshine onto said radiation target means; said target means disposed between said two groups of mirrors, whereby reflected rays from said groups converge to said radiation target means; said mirror cover means comprising a pair of mirror cover plates pivoted on said movable frame on said respective second and third axes and substantially parallel to said respective groups; said cover plates having free edges adapted to be disposed in upstanding relation above said second and third axes toward said radiation target means at opposite sides thereof, said free edges terminating below said radiation target means, said free edges adapted to move in arcuate paths downwardly and outwardly away from each other and said radiation target means to cover said respective groups of mirrors.

5. The invention, as defined in claim 4, wherein: linkage pivotally connects said cover plates and is adapted to cause concurrent movements thereof into covering or uncovering positions relative to said respective groups of mirrors.

6. The invention, as defined in claim 5, wherein: said actuator means is coupled to said linkage and includes resilient means disposed to pivot said cover plates downwardly into covering positions relative to said groups of mirrors.

7. The invention, as defined in claim 6, wherein: a solenoid operated latch means is disposed to release said linkage and cover plates so that they may be moved to said covering position by said resilient means.

8. The invention, as defined in claim 1, wherein: releasable holddown latch means is disposed to hold said mirror cover means downwardly in covering position relative to said mirror means, said holddown latch means pivotally carried by said movable frame in a position to snap into latched position, when said cover means is moved into covering position over said mirror means.

9. The invention, as defined in claim 5, wherein: said linkage comprises a pair of bell cranks connected to respective ones of said pair of cover plates; and a link interconnecting said bell cranks at opposite sides of the pivotal axes of the respective cover plates so that they may concurrently pivot together in opposite directions.

References Cited
UNITED STATES PATENTS
2,945,417   7/1960   Caryl et al.

RONALD L. WIBERT, Primary Examiner
O. B. CHEA II, Assistant Examiner

U.S. Cl. X.R.
126—270